United States Patent
Li et al.

(10) Patent No.: US 8,438,583 B2
(45) Date of Patent: May 7, 2013

(54) ELECTRONIC DEVICE HAVING HEAT DISSIPATION AIRFLOW PATH

(75) Inventors: Hong Li, Shenzhen (CN); Xiao-Hui Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 140 days.

(21) Appl. No.: 13/095,896

(22) Filed: Apr. 28, 2011

(65) Prior Publication Data

US 2012/0174136 A1    Jul. 5, 2012

(30) Foreign Application Priority Data

Dec. 31, 2010    (CN) .......................... 2010 1 0616831

(51) Int. Cl.
*G11B 33/14*    (2006.01)
*H05K 7/20*    (2006.01)

(52) U.S. Cl.
USPC ..................................... 720/649; 361/679.54

(58) Field of Classification Search .................. 720/600, 720/601, 603, 648, 649, 652, 655; 361/679.33–679.39, 679.46–679.54
See application file for complete search history.

(56) References Cited

U.S. PATENT DOCUMENTS

| | | | |
|---|---|---|---|
| 7,612,996 B2* | 11/2009 | Atkins et al. | 361/679.51 |
| 2005/0240949 A1* | 10/2005 | Liu et al. | 720/649 |
| 2006/0011330 A1* | 1/2006 | Wang | 361/687 |
| 2006/0064710 A1* | 3/2006 | Huang et al. | 720/649 |
| 2008/0062636 A1* | 3/2008 | Liu | 361/685 |
| 2008/0080125 A1* | 4/2008 | Chikazawa et al. | 361/680 |
| 2010/0188815 A1* | 7/2010 | Yamagiwa | 361/692 |

FOREIGN PATENT DOCUMENTS

JP    2003085964 A    *    3/2003

OTHER PUBLICATIONS

English Translation of JP 2003085964 A.*

* cited by examiner

*Primary Examiner* — Nathan Danielsen
(74) *Attorney, Agent, or Firm* — Altis Law Group, Inc.

(57) ABSTRACT

An exemplary electronic device includes a cover, a circuit board and a driving module both mounted on the bottom cover, an electronic component fixed on the circuit board, a heat dissipating plate mounted on the circuit board and thermally contacting the electronic component, and a top cover covering the bottom cover. The driving module has a rotating shaft adapted for supportively driving an optical disk to rotate. The electronic component generates heat during operation. Through holes are defined in the top cover and located at a periphery of the rotating shaft. Two opposing elongated extending portions extend downwardly from the heat dissipating plate towards the circuit board. An airflow channel is formed between the two extending portions under the heat dissipating plate and aligned with the electronic component.

20 Claims, 6 Drawing Sheets

ELECTRONIC DEVICE HAVING HEAT DISSIPATION AIRFLOW PATH

BACKGROUND

1. Technical Field

The disclosure relates to electronic devices such as consumer electronic devices, and particularly to an electronic device facilitating heat dissipation.

2. Description of Related Art

Nowadays, with the development of electronics technology, an electronic device such as a digital video disc (DVD) player is devised to be much thinner and smaller than before, yet hold many more electronic modules. The electronic modules generate a large amount of heat during operation. The interior space of the electronic device is very limited, and the electronic modules occupy much of that space. This can result in the heat generated by the electronic modules accumulating rather than being dissipated in time.

What is needed, therefore, is an electronic device which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
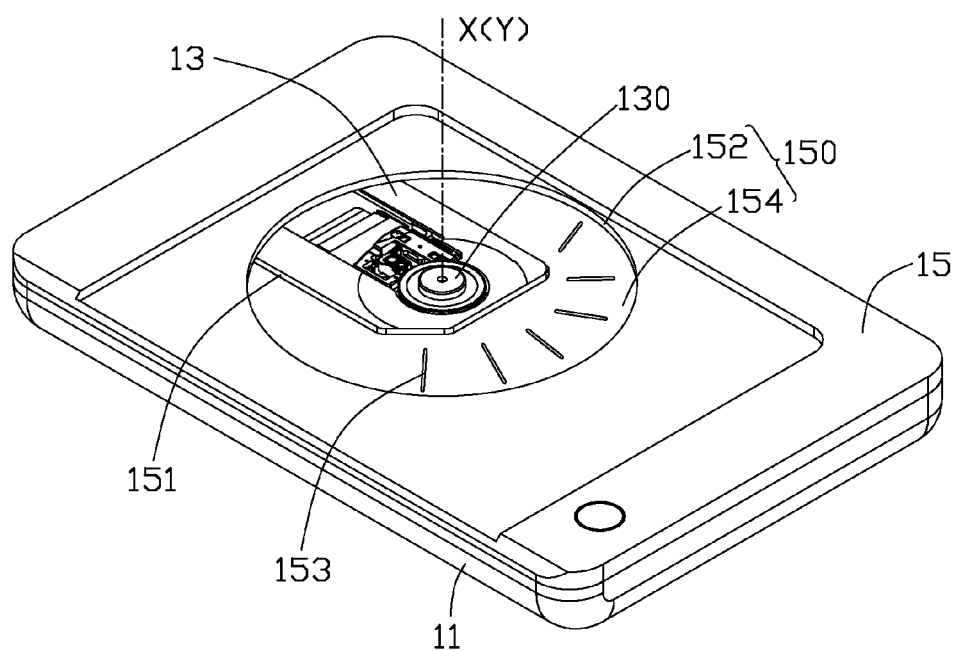
FIG. 1 is an isometric, assembled view of an electronic device in accordance with one embodiment of the disclosure, the electronic device including a top cover.
Figure 2:
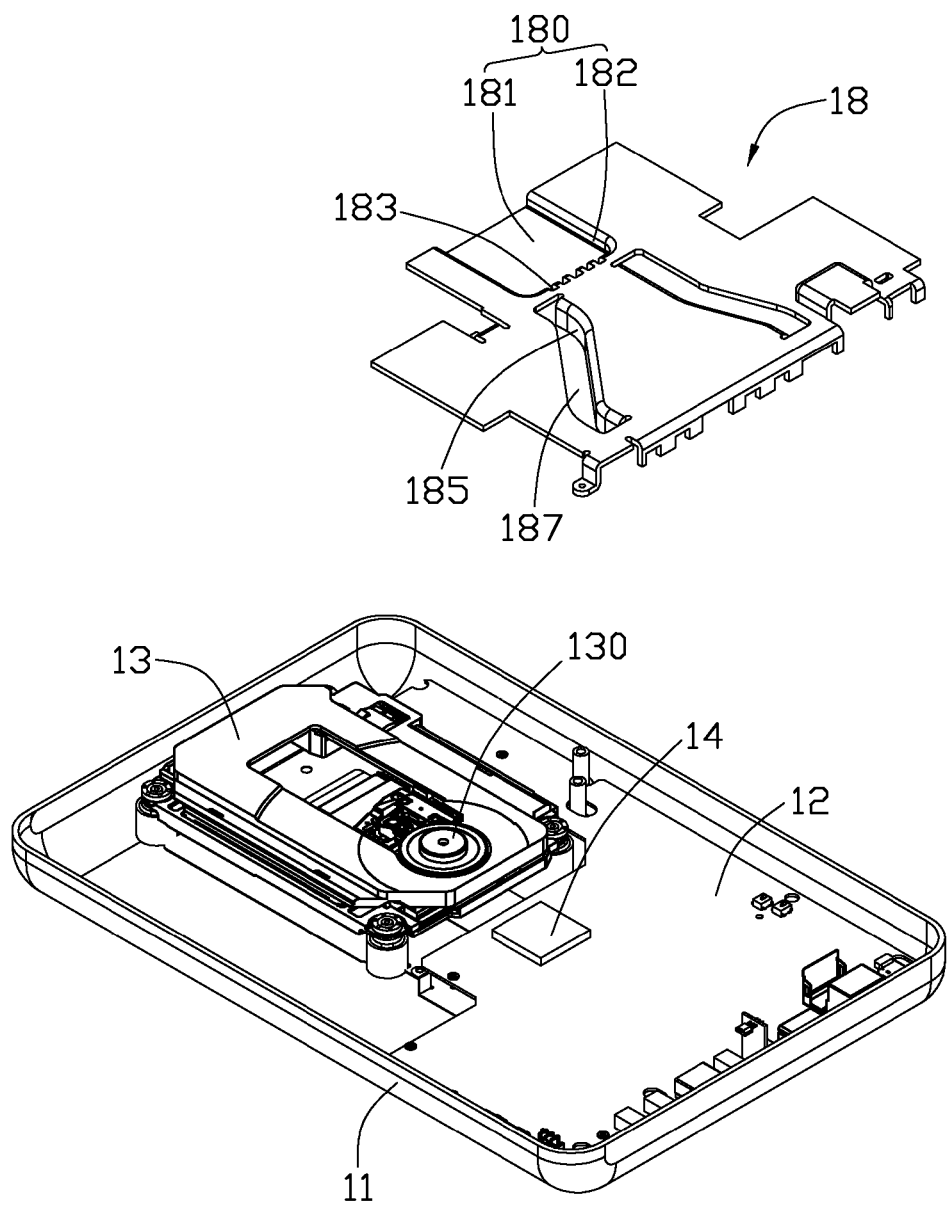
FIG. 2 is an exploded view of the electronic device of FIG. 1, but with the top cover of the electronic device omitted.

Referring to FIGS. 1-2, an electronic device in accordance with an embodiment of the disclosure includes a bottom cover 11, a motherboard 12, a driving module 13, an electronic component 14, a heat dissipating plate 18, and a top cover 15. The top cover 15 and the bottom cover 11 are assembled together, and receive the motherboard 12, the driving module 13, the electronic component 14 and the heat dissipating plate 18 therein. The electronic component 14 generates heat during operation, and is arranged on a top side of the motherboard 12 near the driving module 13. The heat dissipating plate 18 is mounted on the motherboard 12. In this embodiment, the electronic device is a DVD player.

Figure 3:
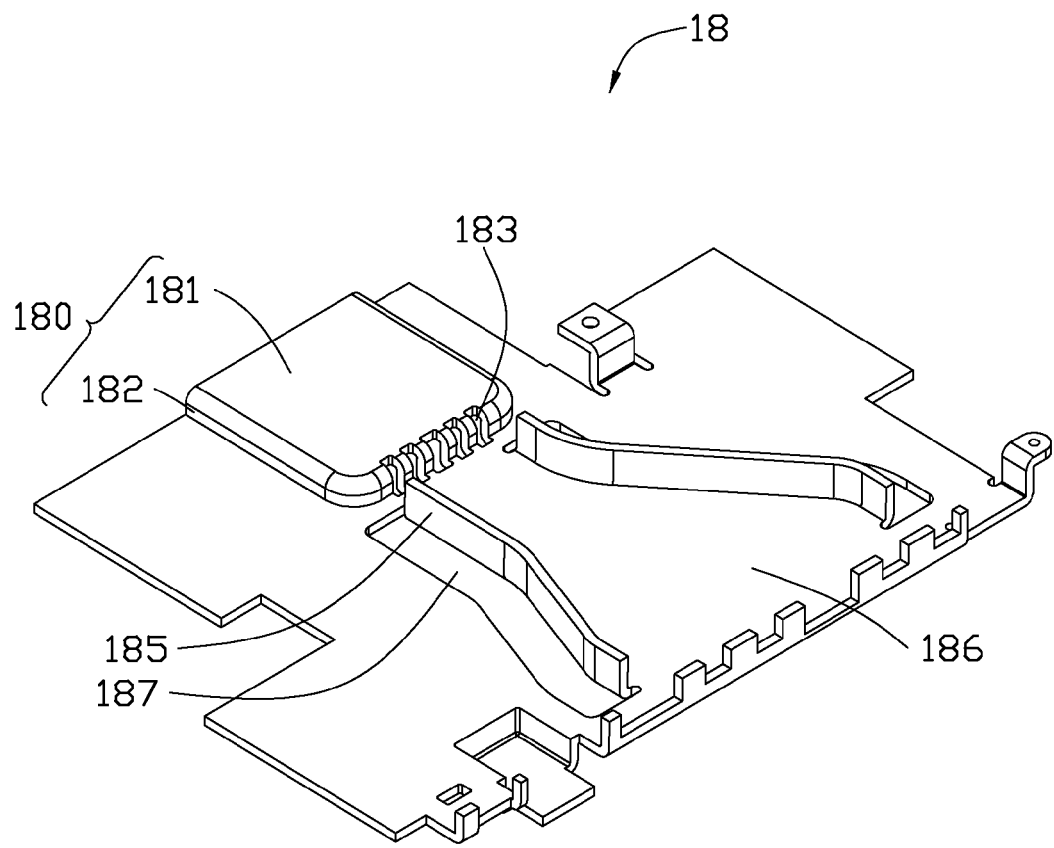
FIG. 3 is an isometric view of a heat dissipating plate of the electronic device of FIG. 2, but showing the heat dissipating plate inverted.

Also referring to FIG. 3, the bottom cover 11 defines a plurality of ventilation holes 110 in a lateral side thereof. Cooling air of the ambient environment can flow through the ventilation holes 110 into the electronic device. In the illustrated embodiment, the ventilation holes 110 are in the form of elongated through slots, which are parallel to each other and arranged in line. The motherboard 12 extends from the lateral side of the bottom cover 11 to a middle of the bottom cover 11. The driving module 13 extends from an opposite lateral side of the bottom cover 11 to the middle of the bottom cover 11. The driving module 13 has a rotating shaft 130, which is located near the middle of the bottom cover 11. The electronic component 14 is located between the rotating shaft 130 and the ventilation holes 110 of the bottom cover 11.

Figure 4:
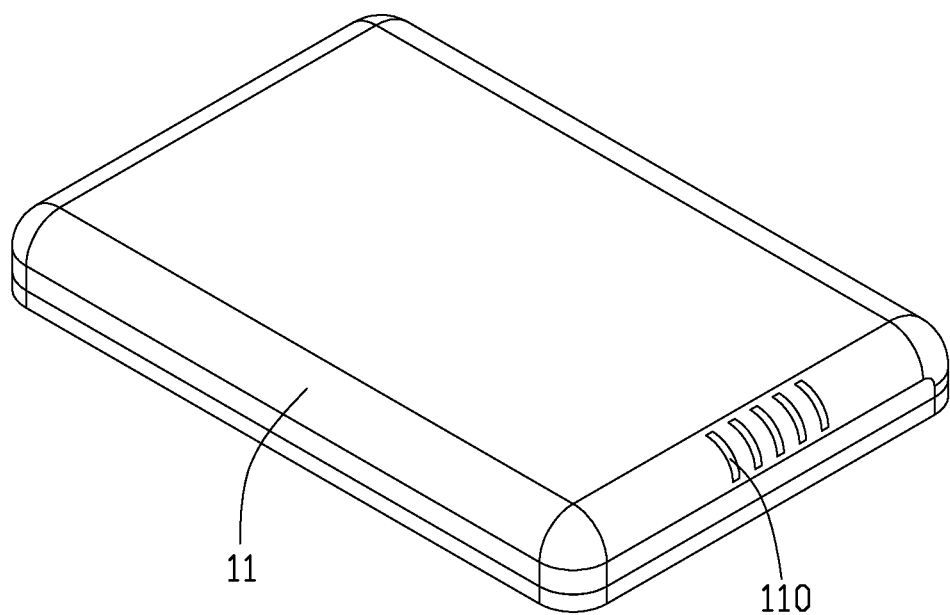
FIG. 4 is a view of the electronic device of FIG. 1, but showing the electronic device inverted.

Also referring to FIG. 4, the heat dissipating plate 18 is integrally made of a metal sheet. That is, in the present embodiment, the heat dissipating plate 18 is a single, monolithic body of the same material. A portion of the heat dissipating plate 18 corresponding to the electronic component 14 is recessed downwardly, and accordingly a depressed portion 180 is formed. The depressed portion 180 includes a substantially rectangular bottom wall 181, and a side wall 182 connecting an outer edge of the bottom wall 181 with a top face of the heat dissipating plate 18. The outer edge of the bottom wall 181 is generally three-sided, and the side wall 182 is correspondingly generally three-sided. The bottom wall 181 thermally contacts the electronic component 14. A plurality of air outlets 183 are defined in a portion of the side wall 182 opposite to the ventilation holes 110 of the bottom cover 11. The air outlets 183 are in the form of through slots, which are parallel to each other and arranged in line.

Figure 5:
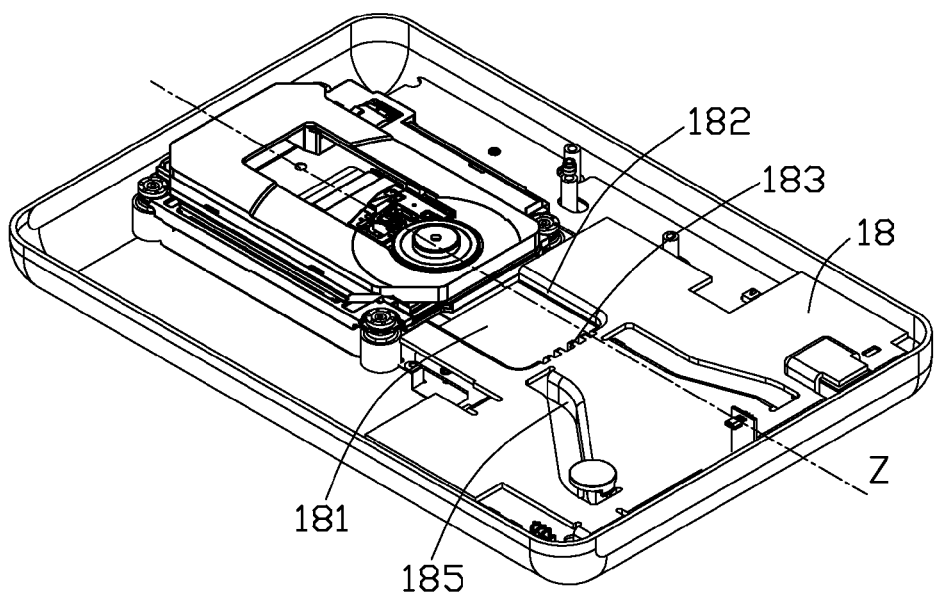
FIG. 5 is an assembled view of the electronic device shown in FIG. 2.

The heat dissipating plate 18 has two symmetrically opposite elongated extending portions 185 punched downward from the top face thereof. The extending portions 185 thus extend downwardly towards the motherboard 12, and a bottom edge of each extending portion 185 abuts against the motherboard 12. Two corresponding punching holes 187 are formed in the heat dissipating plate 18 after the two extending portions 185 are punched. The extending portions 185 and a portion of the heat dissipating plate 18 between the extending portions 185 cooperatively define an airflow channel 186, which extends from a portion of the heat dissipating plate 18 near the air outlets 183 of the side wall 182 to a portion of the heat dissipating plate 18 near the ventilation holes 110 of the bottom cover 11. Also referring to FIG. 5, the rotating shaft 130, the electronic component 14, the airflow channel 186, and the ventilation holes 110 are substantially aligned along a longitudinal axis Z of the bottom cover 11.

Referring back to FIG. 1, a circular depression 150 is inwardly formed at a middle of the top cover 15. A central axis X of the depression 150 coincides with a central axis Y of the rotating shaft 130 of the driving module 13. The depression 150 includes a substantially circular bottom wall 154, and a side wall 152 connecting an outer edge of the bottom wall 154 with a top face of the top cover 15. The bottom wall 154 of the depression 150 defines a cutout 151 therein, corresponding to the driving module 13. A portion of the driving module 13 including the rotating shaft 130 extends through the cutout 151 of the depression 150 into a circular recess corresponding to and defined by the depression 150. A plurality of elongated through holes 153 are defined in a portion of the bottom wall 154 opposite to the portion of the bottom wall 154 defining the cutout 151. The through holes 153 are located at a periphery of the rotating shaft 130. In the illustrated embodiment, the through holes 153 are in the form of through slots. The through holes 153 extend generally radially outwardly, and are located over the depressing portion 180 of the heat dissipating plate 18.

Figure 6:
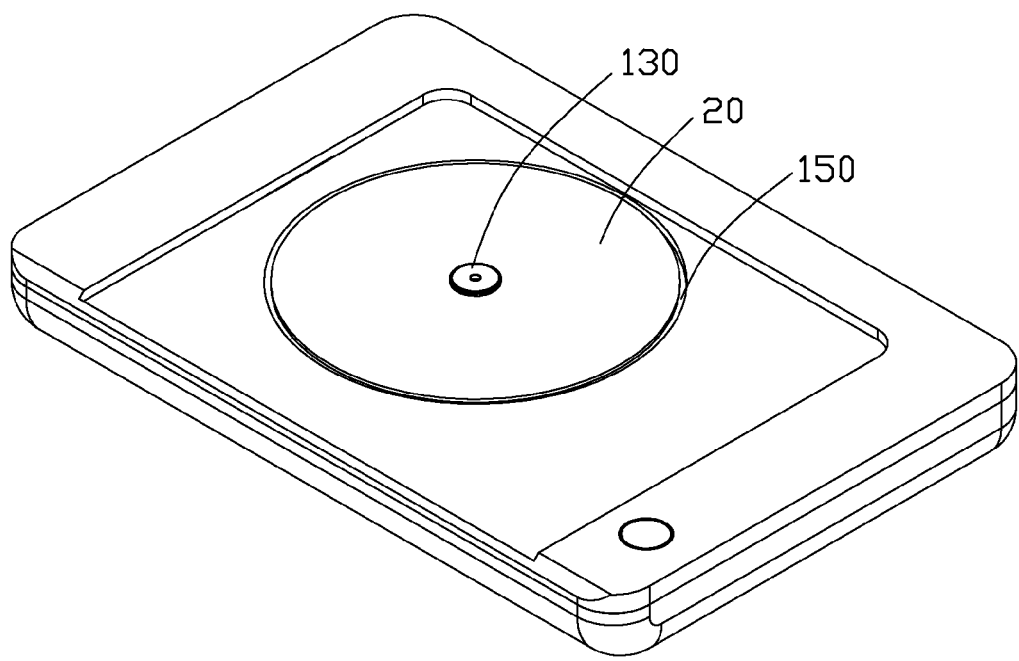
FIG. 6 is similar to FIG. 1, but showing an optical disk engaged on the electronic device.

Also referring to FIG. 6, in use, an optical disk 20 is received in the depression 150 and mounted on the rotating shaft 130. The optical disk 20 is driven to rotate by the rotating shaft 130. Typically, the direction of rotation is clockwise. The electronic component 14 on the motherboard 12 generates heat during operation. The bottom wall 181 of the depressed portion 180 of the heat dissipating plate 18 absorbs heat generated by the electronic component 14, and heats the air in the electronic device. The air pressure below the depression 150 is greater than the air pressure in the recess of the depression 150 due to the rotating of the optical disk 20. Thus the heated air in the airflow channel 186 of the heat dissipating plate 18 flows through the air outlets 183 of the side wall 182 of the depressed portion 180 of the heat dissipating plate 18, and through the through holes 153 and the cutout 151 of the depression 150, and rotates following the rotating of the optical disk 20. Then the heated air is dispelled to an outside of the top cover 15 by the optical disk 20. Simultaneously, cooling air in the ambient environment flows into the electronic device via the ventilation holes 110 of the bottom cover 11, to compensate the air pressure inside the electronic device. In such manner, the electronic component 14 is cooled efficiently by the rotating of the optical disk 20.

It is believed that the disclosure and its advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device comprising:
a bottom cover;
a circuit board mounted on the bottom cover;
a driving module mounted on the bottom cover and having a rotating shaft adapted for supportively driving an optical disk to rotate;
an electronic component fixed on the circuit board and generating heat during operation;
a heat dissipating plate mounted on the circuit board, a first part of a main body of the heat dissipating plate thermally contacting the electronic component, the heat dissipating plate comprising two opposing elongated extending portions extending downwardly from a second part of the main body thereof towards the circuit board, an airflow channel being formed between the two extending portions under the heat dissipating plate, the airflow channel being aligned with the electronic component; and
a top cover assembled to the bottom cover to cooperatively receive the circuit board, the driving module, and the heat dissipating plate therein, a plurality of through holes being defined in the top cover at a periphery of the rotating shaft;
wherein when the optical disk is mounted on the rotating shaft and driven to rotate by the rotating shaft, air flows along the airflow channel to the first part of the main body of the heat dissipating plate and then through the through holes of the top cover to be exhausted out from the electronic device, thereby taking away heat of the heat dissipating plate absorbed from the electronic component, with the rotation of the optical disk facilitating such airflow.

2. The electronic device of claim 1, wherein a depressed portion is formed at the first part of the main body of the heat dissipating plate, the depressed portion comprising a bottom wall thermally contacting the electronic component, and a side wall connecting an outer edge of the bottom wall with a top face of the heat dissipating plate, a plurality of air outlets being defined in a portion of the side wall and communicating with the airflow channel.

3. The electronic device of claim 1, wherein a bottom edge of each extending portion abuts the circuit board.

4. The electronic device of claim 1, wherein the two extending portions are punched downwardly from the second part of the main body of the heat dissipating plate, and two corresponding punching holes are thus defined in the heat dissipating plate corresponding to the extending portions.

5. The electronic device of claim 1, wherein each of the through holes is elongated, the through holes extending radially outwardly away from the rotating shaft.

6. The electronic device of claim 1, wherein the through holes are located over the electronic component.

7. The electronic device of claim 1, wherein a depression adapted for receiving the optical disk is inwardly formed on the top cover, a central axis of the depression coinciding with a central axis of the rotating shaft of the driving module.

8. The electronic device of claim 7, wherein the depression comprises a bottom wall, and a peripheral side wall connecting an outer edge of the bottom wall with a top surface of the top cover, the through holes being defined in the bottom wall of the depression.

9. The electronic device of claim 8, wherein a cutout is defined in a portion of the bottom wall of the depression opposite to a portion of the bottom wall in which the through holes are defined, the rotating shaft extending up through the cutout and protruding above the bottom wall.

10. The electronic device of claim 1, wherein a cutout is defined in a portion of the top cover opposite to a portion of the top cover in which the through holes are defined, the rotating shaft extending up through the cutout and protruding from the top cover.

11. The electronic device of claim 1, wherein the bottom cover defines a plurality of ventilation holes opposite to the air outlets of the heat dissipating plate.

12. The electronic device of claim 11, wherein the ventilation holes of the bottom cover are located near the second part of the main body of the heat dissipating plate, far from the electronic component.

13. The electronic device of claim 11, wherein the electronic component is located between the rotating shaft of the driving module and the ventilation holes of the bottom cover.

14. The electronic device of claim 13, wherein the rotating shaft, the electronic component, the airflow channel, and the ventilation holes are substantially aligned along a same longitudinal axis of the bottom cover.

15. An electronic device comprising:
a bottom cover defining a plurality of ventilation holes therein;
a motherboard and a driving module both positioned at an inner side of the bottom cover, the driving module having a rotating shaft adapted for driving an optical disk to rotate;
an electronic component fixed on the motherboard and generating heat during operation;
a heat dissipating plate mounted on the motherboard, a heat-absorbing part of the heat dissipating plate thermally contacting the electronic component, two opposing elongated extending portions being formed at another part of the heat dissipating plate, the extending portions extending downwardly towards the motherboard, the two extending portions and a portion of the another part of the heat dissipating plate between the two extending portions cooperatively forming an airflow channel, the airflow channel extending from an end of the heat dissipating plate near the ventilation holes to the heat-absorbing part of the heat dissipating plate, a plurality of air outlets being defined in the heat dissipating plate where the airflow channel meets the heat-absorbing part thereby allowing air in the airflow channel to access and flow across the heat-absorbing part; and a top cover substantially covering the bottom cover, the motherboard, the heat dissipating plate and the driving module, a circular depression adapted for receiving the optical disk being inwardly formed from the top cover, a plurality of through holes being defined in the circular depression;

wherein the ventilation holes, the airflow channel, the air outlets and the through holes cooperatively define an airflow path for ambient air to enter the electronic device and for air in the electronic device to flow past and draw heat from the heat-absorbing part of the heat dissipating plate and finally be exhausted to the outside of the top cover.

16. The electronic device of claim 15, wherein the circular depression comprises a bottom wall and a side wall connecting an outer edge of the bottom wall with the top cover, the through holes being defined in the bottom wall of the circular depression.

17. The electronic device of claim 16, wherein a cutout is defined in a side portion of the bottom wall of the circular depression opposite to the through holes, the rotating shaft extending through the cutout.

18. The electronic device of claim 15, wherein each of the through holes is elongated, the through holes extending radially outwardly from the rotating shaft.

19. The electronic device of claim 15, wherein a depressed portion is formed at the heat-absorbing part of the heat dissipating plate, the depressed portion comprising a bottom wall thermally contacting the electronic component, and a side wall connecting an outer edge of the bottom wall with a top face of the heat dissipating plate, the plurality of air outlets being defined in a portion of the side wall.

20. The electronic device of claim 15, wherein the rotating shaft, the electronic component, the airflow channel, and the ventilation holes are substantially aligned along a same longitudinal axis of the bottom cover.

* * * * *